(12) United States Patent
Inoue (10) Patent No.: US 10,836,290 B2
(45) Date of Patent: Nov. 17, 2020

(54) VEHICLE SEAT

(71) Applicant: Toyota Jidosha Kabushiki Kaisha, Toyota (JP)

(72) Inventor: Shotaro Inoue, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/503,867

(22) Filed: Jul. 5, 2019

(65) Prior Publication Data
US 2020/0047653 A1 Feb. 13, 2020

(30) Foreign Application Priority Data

Aug. 7, 2018 (JP) .................................. 2018-148875

(51) Int. Cl.
| | | |
|---|---|---|
| *B60N 2/42* | (2006.01) | |
| *B60N 2/427* | (2006.01) | |
| *B60N 2/879* | (2018.01) | |
| *B60N 2/20* | (2006.01) | |
| *B60N 2/72* | (2006.01) | |
| *B60N 2/80* | (2018.01) | |

(52) U.S. Cl.
CPC .............. *B60N 2/879* (2018.02); *B60N 2/20* (2013.01); *B60N 2/72* (2013.01); *B60N 2002/899* (2018.02)

(58) Field of Classification Search
CPC ........... B60N 2/80; B60N 2/252; B60N 2/803
See application file for complete search history.

(56) References Cited

U.S. PATENT DOCUMENTS

| | | | | |
|---|---|---|---|---|
| 5,181,763 A * | 1/1993 | Dellanno | ............... | B60N 2/809 297/391 |
| 5,328,244 A * | 7/1994 | Ishihara | ................. | B60N 2/882 297/391 |
| 5,961,182 A * | 10/1999 | Dellanno | ............. | B60N 2/4228 297/216.12 |
| 8,469,445 B2 * | 6/2013 | Hertl | ........................ | B60N 2/80 297/216.12 |
| 9,283,877 B2 * | 3/2016 | Mizobata | ............... | B60N 2/824 |
| 9,387,784 B2 * | 7/2016 | Haga | ..................... | B60N 2/4885 |
| 9,539,923 B2 * | 1/2017 | Ishimoto | ................. | B60N 2/64 |
| 2011/0198899 A1 * | 8/2011 | Hertl | ........................ | B60N 2/80 297/216.12 |
| 2013/0270878 A1 * | 10/2013 | Adachi | ............. | B60N 2/42745 297/216.14 |

(Continued)

FOREIGN PATENT DOCUMENTS

| | | |
|---|---|---|
| JP | 2006-315623 A | 11/2006 |
| JP | 2009-234286 A | 10/2009 |

*Primary Examiner* — Shin H Kim
(74) *Attorney, Agent, or Firm* — Dinsmore & Shohl LLP (57) ABSTRACT

A vehicle seat includes: a seat cushion; a seatback that is rotatably connected to a seat rear side of the seat cushion; a headrest that is provided at a seat upper side end portion of the seatback, and that is configured to support a head portion of a vehicle occupant; and a hardness changing section that changes a hardness of a seat front side of the headrest by compressing a pad at an interior of the headrest, in a case in which an angle of inclination of the seatback with respect to the seat cushion is smaller than a predetermined angle, and canceling a compressed state of the pad, in a case in which the angle of inclination is larger than the predetermined angle.

5 Claims, 7 Drawing Sheets

(56) References Cited

U.S. PATENT DOCUMENTS

| | | | |
|---|---|---|---|
| 2014/0312664 A1* | 10/2014 | Tanabe | B60N 2/5841 297/216.13 |
| 2015/0246628 A1* | 9/2015 | Ishimoto | B60N 2/809 297/410 |
| 2015/0343927 A1* | 12/2015 | Haga | B60N 2/806 297/404 |
| 2018/0056836 A1* | 3/2018 | Schacht | B60N 2/70 |
| 2018/0215293 A1* | 8/2018 | Gandhi | B60N 2/70 |
| 2019/0106037 A1* | 4/2019 | Mankame | A47C 7/20 |
| 2019/0266993 A1* | 8/2019 | Linjama | A47C 7/35 |
| 2020/0047653 A1* | 2/2020 | Inoue | B60N 2/20 |

* cited by examiner

VEHICLE SEAT

CROSS-REFERENCE TO RELATED APPLICATION

This application claims priority under 35 USC 119 from Japanese Patent Application No. 2018-148875, filed on Aug. 7, 2018, the disclosure of which is incorporated by reference herein.

BACKGROUND

Technical Field

The present disclosure relates to a vehicle seat.

Related Art

Japanese Patent Application Laid-Open (JP-A) No. 2009-234286 discloses a structure in which a supporting plate is provided at the interior of a headrest, and the supporting plate is moved in the seat longitudinal direction by a moving mechanism that is provided at the rear of the supporting plate. Due thereto, at the time of a rear collision of the vehicle, the headrest is made harder, and the head portion of a vehicle occupant sinking into the headrest is suppressed.

Due to advances in techniques relating to self-driving vehicles in recent years, situations in which the driver sets his/her seat in a reclined state even while the automobile is traveling are assumed. On the other hand, the headrest may be made hard during driving.

SUMMARY

The present disclosure provides a vehicle seat that may change the hardness of a headrest between times during driving and times when the seatback is in a reclined state.

A first aspect of the present disclosure is a vehicle seat including: a seat cushion; a seatback that is rotatably connected to a seat rear side of the seat cushion; a headrest that is provided at a seat upper side end portion of the seatback, and that is configured to support a head portion of a vehicle occupant; and a hardness changing section that changes a hardness of a seat front side of the headrest by compressing a pad at an interior of the headrest, in a case in which an angle of inclination of the seatback with respect to the seat cushion is smaller than a predetermined angle, and canceling a compressed state of the pad, in a case in which the angle of inclination is larger than the predetermined angle.

In the vehicle seat of the first aspect, the seatback is rotatably connected to the seat rear side of the seat cushion, and the headrest is provided at the upper end portion of the seatback. Further, the vehicle seat has the hardness changing section that changes the hardness of the seat front side of the headrest. Here, in a case in which the angle of inclination of the seatback with respect to the seat cushion is smaller than a predetermined angle, i.e., in a case in which the seatback is in an upright state, the hardness changing section compresses the pad that is at the interior of the headrest. Due thereto, the headrest may be made to be hard during driving.

Further, in a case in which the angle of inclination of the seatback with respect to the seat cushion is larger than the predetermined angle, i.e., in a case in which the seatback is in a reclined state, the hardness changing section cancels the compressed state of the pad. Due thereto, the headrest becomes soft when the seatback is in the reclined state.

In a second aspect of the present disclosure, in the first aspect, the hardness changing section may be structured to include a supporting plate that is disposed at a seat rear side of the pad and that is configured to move in a seat longitudinal direction, an urging member that urges the supporting plate toward a seat front side, and a moving mechanism that operates and that moves the supporting plate toward a seat rear side in a case in which the angle of inclination is larger than the predetermined angle.

In the vehicle seat of the second aspect, in a case in which the angle of inclination of the seatback is larger than the predetermined angle, due to the moving mechanism operating and the moving mechanism moving the supporting plate toward the seat rear side, the compressed state of the pad is cancelled. Further, in a non-operating state in which the moving mechanism is not operating, the supporting plate is urged toward the seat front side by the urging member. Due thereto, when the seatback is in the upright state, the compressed state of the pad is not inadvertently cancelled.

In a third aspect of the present disclosure, in the second aspect, the moving mechanism may be structured to include a take-up device that is provided at an interior of the seatback, and a wire having one end portion that is mounted to the supporting plate and having another end portion that is wound at the take-up device, and the wire is taken-up by the take-up device in a case in which the angle of inclination is large, and the wire is pulled-out from the take-up device in a case in which the angle of inclination is small.

In the vehicle seat of the third aspect, in a case in which the angle of inclination of the seatback is large, the wire is taken-up by the take-up device that is provided at the interior of the seatback. Due thereto, the tension that is applied to the wire is greater than the urging force of the urging member, and the supporting plate is moved toward the seat rear side. Further, in a case in which the angle of inclination of the seatback is small, the wire is pulled-out from the take-up device. Due thereto, the tension that is applied to the wire becomes smaller than the urging force of the urging member, and the supporting plate is moved toward the seat front side.

In a fourth aspect of the present disclosure, in the second aspect, the moving mechanism may be structured to include a wire having one end portion that is mounted to the supporting plate and having another end portion that is mounted to an interior of the seat cushion, and a guiding member that is provided at an interior of the seatback and that guides the wire, and, in a case in which the angle of inclination is large, due to the guiding member moving toward the seat rear side accompanying rotation of the seatback, tension that is applied to the wire is increased, and, in a case in which the angle of inclination is small, due to the guiding member moving toward the seat front side accompanying the rotation of the seatback, the tension that is applied to the wire is decreased.

In the vehicle seat of the fourth aspect, due to the angle of inclination becoming large, the tension that is mechanically applied to the wire increases. Therefore, parts such as a motor and the like for taking-up the wire are not needed.

BRIEF DESCRIPTION OF THE DRAWINGS

Exemplary embodiments of the present disclosure will be described in detail based on the following figures, wherein.

DETAILED DESCRIPTION

First Exemplary Embodiment

A vehicle seat 10 relating to a first exemplary embodiment is described with reference to the drawings. Note that arrow FR, arrow UP and arrow RH that are illustrated appropriately in the respective drawings indicate the forward direction, the upward direction and the rightward direction of the seat, respectively. When description is given by merely using longitudinal, vertical and left-right directions hereinafter, they refer to the longitudinal of the seat longitudinal direction, the vertical of the seat vertical direction, and the left and the right when facing toward the seat forward direction, unless otherwise indicated.

Figure 7:
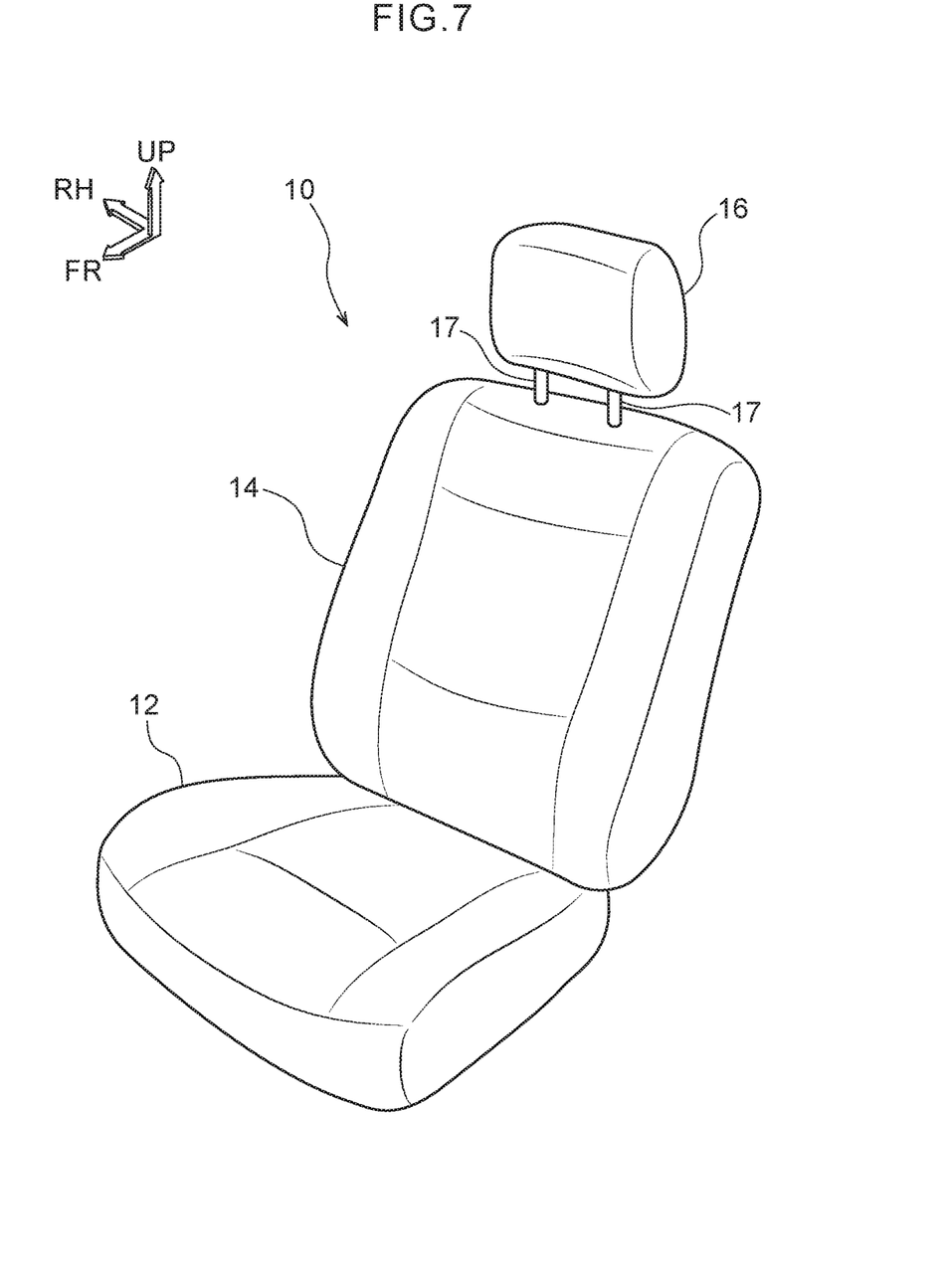
FIG. 7 is a perspective view illustrating the entire vehicle seat.

As illustrated in FIG. 7, the vehicle seat 10 of the present embodiment is structured to include a seat cushion 12, a seatback 14 and a headrest 16. The seat cushion 12 is structured so as to support the femoral regions and the buttocks of a vehicle occupant from the lower side. The seatback 14 is rotatable connected to the seat rear side of the seat cushion 12.

The seatback 14 extends toward the seat upper side from the seat cushion 12, and is structured such that the back portion of the vehicle occupant can be supported by the seatback 14. Further, the headrest 16, which can support the head portion of the vehicle occupant from the seat rear side, is mounted to the end portion at the seat upper side (the upper end portion) of the seatback 14.

Figure 1:
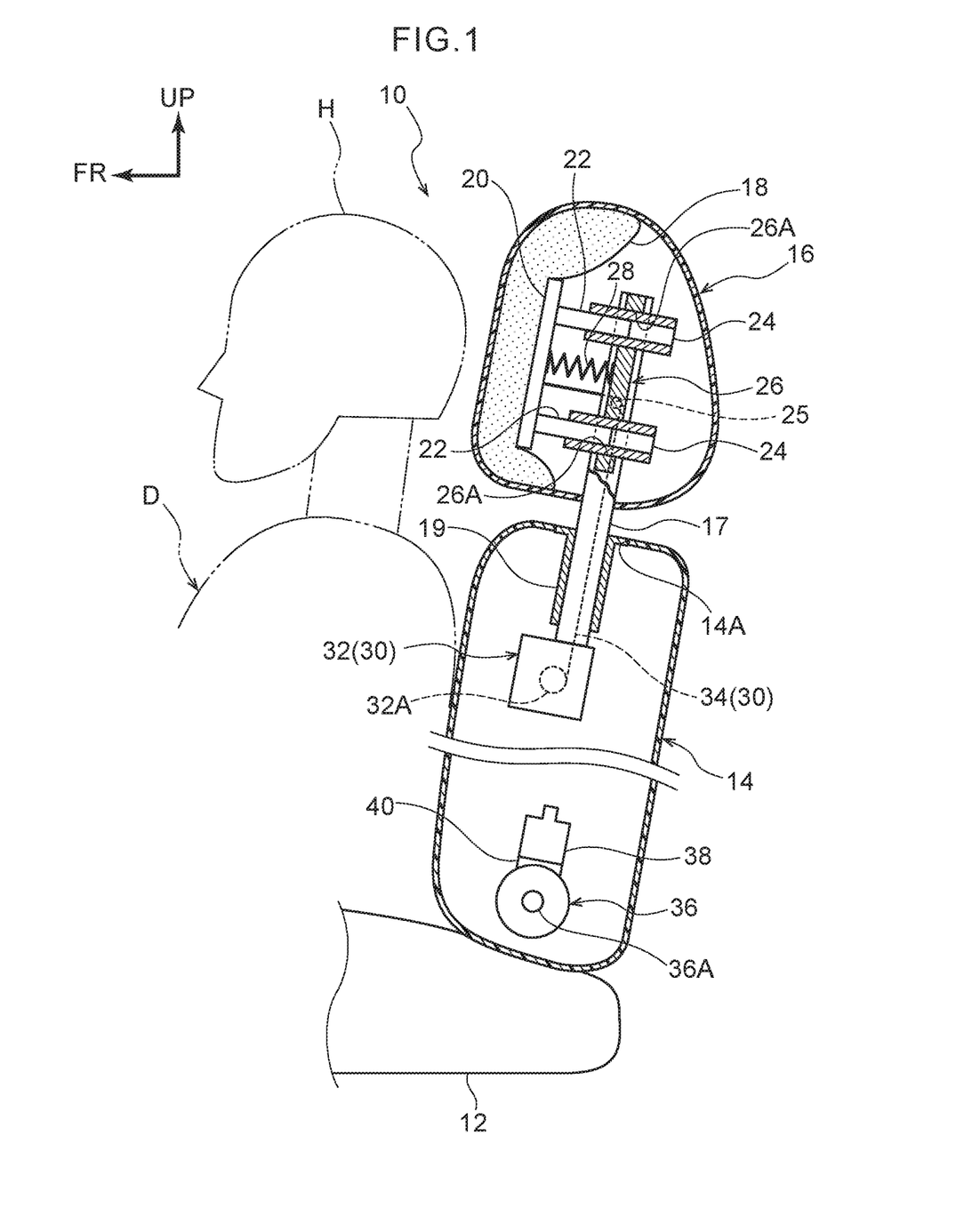
FIG. 1 is a side sectional view of a vehicle seat relating to a first embodiment, and is a drawing illustrating an upright state of a seatback.

As illustrated in FIG. 1, headrest stays 17 that extend in the seat vertical direction are provided at the interior of the headrest 16. In the present embodiment, as an example, there are a left/right pair of the headrest stays 17. The lower portions of these headrest stays 17 project-out toward the seat lower side from the headrest 16 and are inserted in the seatback 14.

Stay mounting holes 14A are formed in the upper end portion of the seatback 14. Stay guiding members 19 are mounted in these stay mounting holes 14A. The stay guiding members 19 are substantially cylindrical tube shaped members whose axial directions are the seat vertical direction, and the upper end portions of the stay guiding members 19 are at the same height as the upper end portion of the seatback 14. The headrest stays 17 are inserted in the stay guiding members 19.

A headrest pad 18 is provided at the seat front side of the interior of the headrest 16. The headrest pad 16 is covered by a skin 21.

Here, a supporting plate 20 is provided at the seat rear side of the headrest pad 18. The supporting plate 20 is disposed such that the plate thickness direction thereof is the seat longitudinal direction, and extends in the seat transverse direction and the seat vertical direction. Further, the headrest pad 18 is supported from the seat rear side by the supporting plate 20.

Plural rods 22 are mounted to the supporting plate 20. The rods 22 extend toward the seat rear side from the rear surface of the supporting plate 20. In the present embodiment, as an example, four of the rods 22 that are parallel to one another are mounted. (In FIG. 1, the two rods 22 that are at the seat left side are illustrated.)

Each of the rods 22 is slidably inserted in a rod guide 24 that is substantially shaped as a cylindrical tube and is provided at a base plate 26. The base plate 26 is provided between the left and right headrest stays 17 with the plate thickness direction thereof being the seat longitudinal direction. Four through-holes 26A are formed in the base plate 26. The rod guides 24 are fit-together with these through-holes 26A, and the respective rod guides 24 are provided at positions corresponding to the rods 22. Therefore, the base plate 26 is structured so as to be moved in the seat longitudinal direction due to the rods 22 sliding along the rod guides 24.

The supporting plate 20 and the base plate 26 are connected by a compression coil spring 28 that serves as an urging member. Namely, the compression coil spring 28 is disposed between the supporting plate 20 and the base plate 26, and one end portion of the compression coil spring 28 is fixed to the rear surface of the supporting plate 20. On the other hand, another end portion of the compression coil spring 28 is fixed to the front surface of the base plate 26. Therefore, the supporting plate 20 is urged toward the seat front side by the urging force from the compression coil spring 28, and the headrest pad 18 is set in a compressed state.

Here, the vehicle seat 10 has a moving mechanism 30 that moves the supporting plate 20. A hardness changing section is structured to include this moving mechanism 30, the supporting plate 20 and the compression coil spring 28. The hardness of the headrest 16 can be changed by this hardness changing section.

The moving mechanism 30 is structured to include a wire 34 and a take-up device 32. The wire 34 extends in the seat vertical direction along the headrest stays 17. The upper end portion of the wire 34 is trained around a guide roller 25 and extends toward the seat front side, and is fixed to the rear surface of the supporting plate 20. The lower end portion of the wire 34 is connected to the take-up device 32 that is provided at the interior of the seatback 14.

The take-up device 32 has a spool 32A on which the lower end portion of the wire 34 is wound. Further, the take-up device 32 has an unillustrated motor, and is structured such that the spool 32A rotates due to this motor being driven. The take-up device 32 is electrically connected to an unillustrated control section such as an ECU (Electronic Control Unit) or the like. Due to the motor being driven on the basis of signals from the ECU, the wire 34 is taken-up, or the wire 34 is pulled-out.

A recliner 36 for moving the seatback 14 with respect to the seat cushion 12 is provided at the lower end portion of the seatback 14. A motor 38 is mounted to the recliner 36. Due to this motor 38 being driven, the seatback 14 is rotated in the seat longitudinal direction around a rotation shaft 36A with respect to the seat cushion 12.

A sensor 40 such as a rotary encoder or the like is provided at the motor 38. The angle of inclination of the seatback 14 with respect to the seat cushion 12 can be detected by this sensor 40. Further, the sensor 40 is electrically connected to the ECU.

Here, the present embodiment is structured such that, in a case in which the angle of inclination of the seatback 14 that is detected by the sensor 40 changes, the supporting plate 20 is moved by the moving mechanism 30. Movement of the supporting plate 20 by the moving mechanism 30 is described in detail hereinafter.

First, in the state in which a driver D is driving, the angle of inclination of the seatback 14 is relatively small. In this state, the moving mechanism 30 does not operate, and therefore, the wire 34 is in a state of being pulled-out from the take-up device 32. Further, the supporting plate 20 is urged toward the seat front side by the compression coil spring 28, and therefore, the headrest pad 18 is maintained in a compressed state. Namely, the seat front side portion of the headrest 16 (the portion that supports a head portion H of the driver D) is hard.

Figure 2:
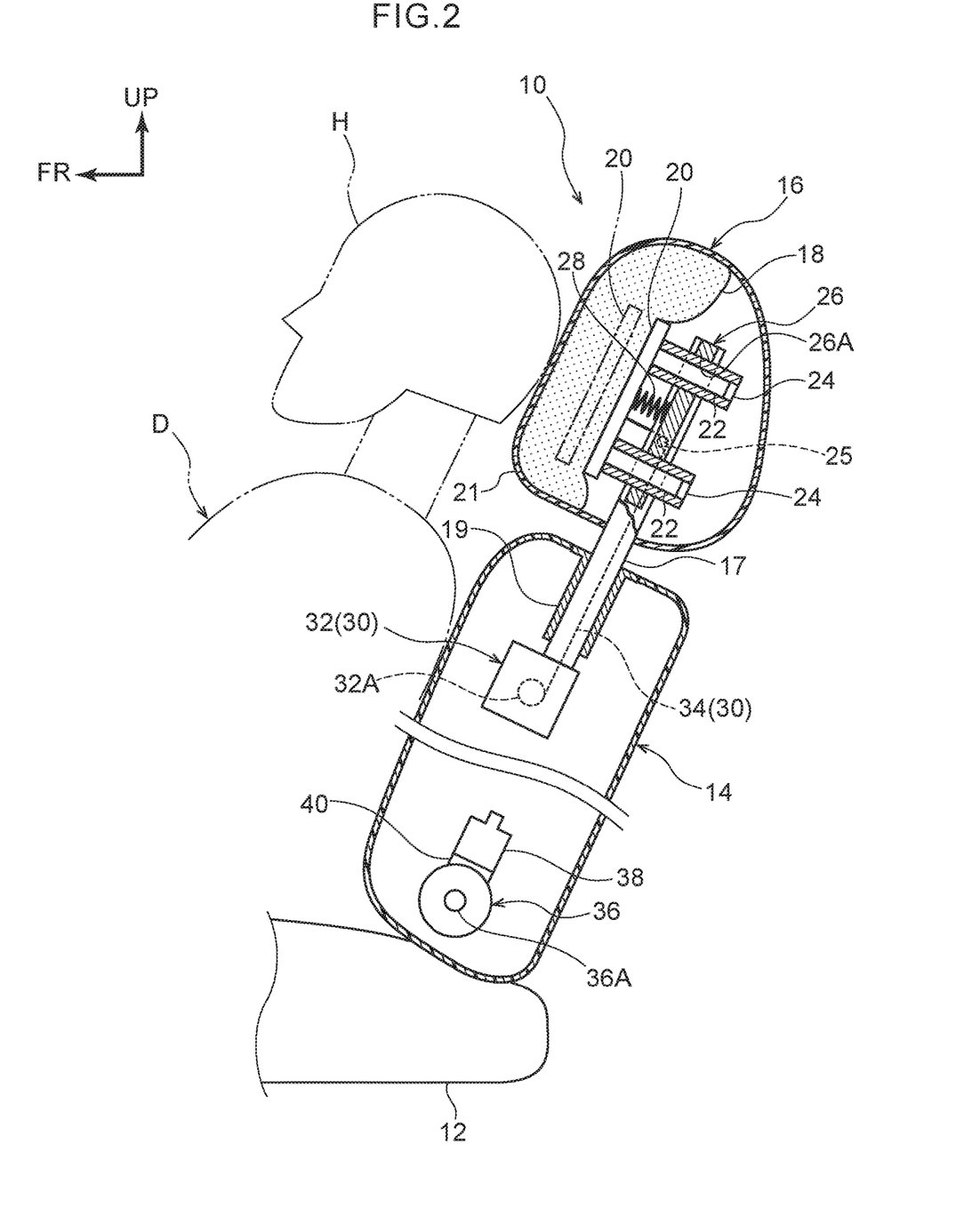
FIG. 2 is a side sectional view that corresponds to FIG. 1 and illustrates a state in which the seatback is tilted from the state of FIG. 1.

Next, as illustrated in FIG. 2, in a case in which the driver D is not carrying out driving such as at the time of automatic driving at a self-driving vehicle or the like, if the angle of inclination of the seatback 14 is made to be large, the angle of inclination exceeds the range of angles of inclination of the seatback 14 during driving. If the angle of inclination that is detected by the sensor 40 becomes greater than a predetermined angle, the take-up device 32 of the moving mechanism 30 is operated by the ECU.

Due to the take-up device 32 being operated, the spool 32A is rotated in the direction of taking-up the wire 34. Due thereto, the wire 34 is taken-up onto the spool 32A, and the tension applied to the wire 34 increases. Further, when the tension that is applied to the wire 34 becomes greater than the urging force of the compression coil spring 28, the supporting plate 20 is moved toward the seat rear side against the urging force of the compression coil spring 28. Due thereto, the compressed state of the headrest pad 18 is cancelled, and the headrest 16 becomes soft.

On the other hand, in a case of returning again to the state of FIG. 1 from the state of FIG. 2, the angle of inclination that is detected by the sensor 40 becomes smaller than the predetermined angle, and the take-up device 32 of the moving mechanism 30 is operated by the ECU. Here, due to the take-up device 32 being operated, the spool 32A is rotated in the direction of pulling-out the wire 34. Due thereto, the tension that is applied to the wire 34 decreases, and the urging force of the compression coil spring 28 becomes greater than this tension, and the supporting plate 20 moves toward the seat front side. As a result, the headrest pad 18 is compressed.

As described above, in a case in which the angle of inclination of the seatback 14 becomes small, the headrest pad 18 is compressed by the hardness changing section. Further, in a case in which the angle of inclination of the seatback 14 becomes large, the compressed state of the headrest pad 18 is cancelled by the hardness changing section. In this way, the hardness of the seat front side of the headrest 16 is changed.

(Operation)

Operation of the present embodiment is described next.

In the vehicle seat 10 of the present embodiment, as described above, in a case in which the angle of inclination of the seatback 14 with respect to the seat cushion 12 is small, i.e., in a case in which the seatback 14 is in an upright state, the headrest pad 18 is compressed. Due thereto, the headrest 16 can be made to be hard during driving by the driver D.

Further, in a case in which the angle of inclination of the seatback 14 is large, i.e., in a case in which the seatback 14 is in a reclined state, the compressed state of the headrest pad 18 is cancelled. Due thereto, the headrest 16 can be made to be soft when the seatback 14 is in the reclined state. In this way, the hardness of the headrest 16 can be changed between times of driving and times when the seatback 14 is in a reclined state. Further, if the headrest 16 is made to be soft when the seatback 14 is in a reclined state, the comfort of the driver D can be improved.

Further, in the present embodiment, in a non-operating state in which the moving mechanism 30 is not operating, the state in which the supporting plate 20 is urged toward the seat front side by the compression coil spring 28 is supported. Due thereto, when the seatback 14 is in an upright state, cancelling of the compressed state of the headrest pad 18 can be suppressed. Namely, the safety of the driver D can be improved.

Moreover, the present embodiment is structured such that the moving mechanism 30 is operated when the angle of inclination of the seatback 14 becomes greater than a predetermined angle. Due thereto, the headrest 16 becoming soft while the seatback 14 is in a range of reclining angles that are generally used during driving can be suppressed. Namely, the headrest 16 can be made to be soft only in cases in which the driver D is in a relaxed posture.

Second Exemplary Embodiment

A vehicle seat 50 relating to a second exemplary embodiment is described next with reference to FIG. 3 and FIG. 4. Note that structures that are similar to those of the first exemplary embodiment are denoted by the same reference numerals, and description thereof is omitted as appropriate.

Figure 3:
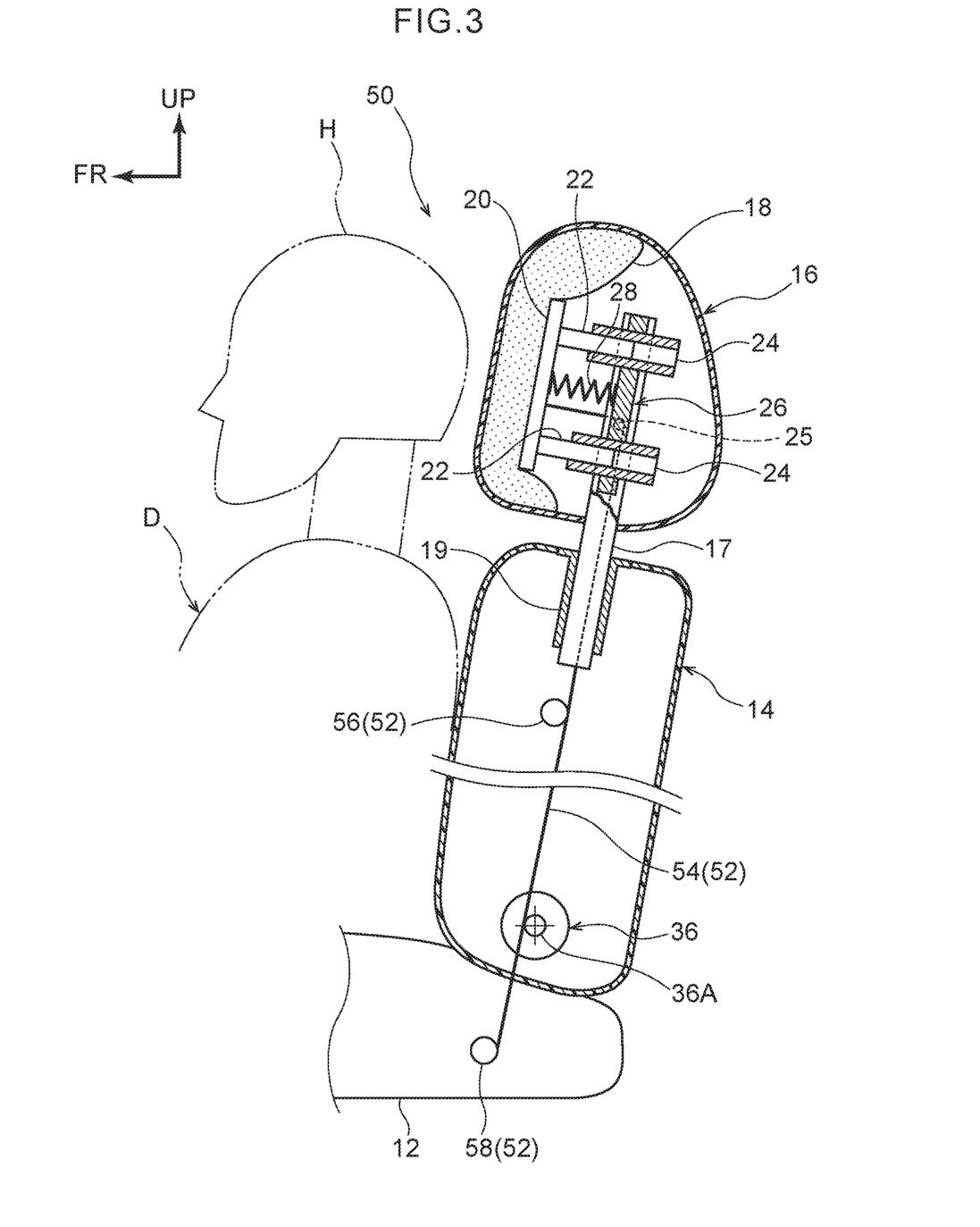
FIG. 3 is a side sectional view of a vehicle seat relating to a second exemplary embodiment, and is a drawing illustrating an upright state of the seatback.

As illustrated in FIG. 3, a moving mechanism 52 that is provided at the vehicle seat 50 of the present embodiment is structured to include a wire 54, a guide roller 56 that serves as a guiding member, and an anchor 58.

The wire 54 extends in the seat vertical direction. The upper end portion (one end portion) of the wire 54 is trained around the guide roller 25, and extends toward the seat front side, and is fixed to the rear surface of the supporting plate 20. Further, the wire 54 extends from the guide roller 25 through the interiors of the seatback 14 and the seat cushion 12 toward the seat lower side, and the lower end portion (another end portion) of the wire 54 is fixed to the anchor 58 that is at the interior of the seat cushion 12.

The guide roller 56, which supports the wire 54 from the seat front side and guides the wire 54, is provided at the interior of the seatback 14. This guide roller 56 is fixed to an unillustrated seatback frame. The wire 54 is supported from the seat rear side by the rotating shaft 36A of the recliner 36. Note that the recliner 36 of the vehicle seat 50 of the present embodiment is manually operated, and the motor 38 is not mounted thereto.

Here, as illustrated in FIG. 3, in the upright state in which the seatback 14 is upright, the tension that is applied to the wire 54 is small. Therefore, the state in which the supporting plate 20 has been moved toward the seat front side by the urging force of the compression coil spring 28 is maintained.

Figure 4:
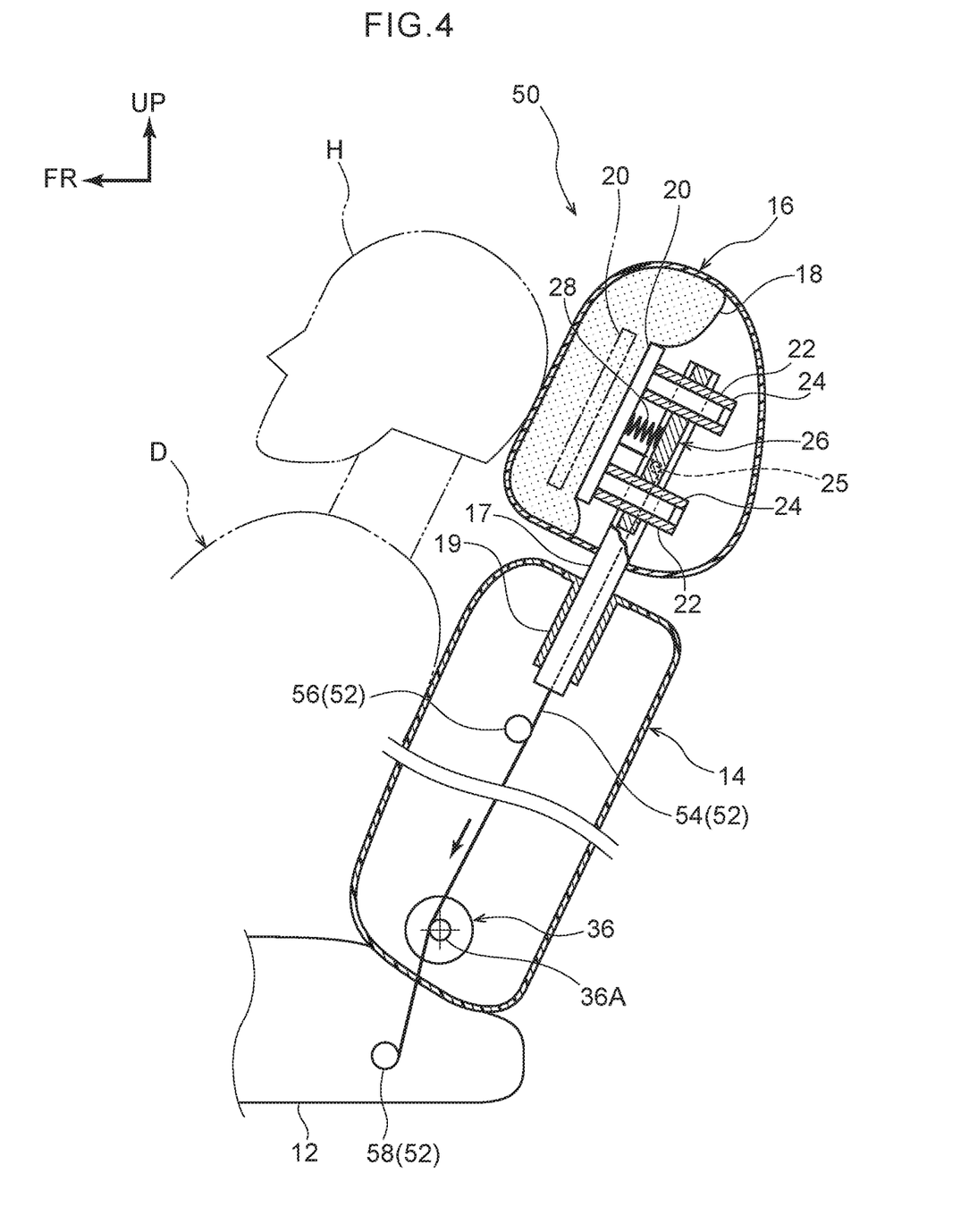
FIG. 4 is a side sectional view that corresponds to FIG. 3 and illustrates a state in which the seatback is tilted from the state of FIG. 3.

When, from this state, the driver D manually operates the recliner 36 and tilts the seatback 14 toward the seat rear side, the angle of inclination of the seatback 14 becomes large as illustrated in FIG. 4.

As illustrated in FIG. 4, when the angle of inclination of the seatback 14 becomes large and the seatback 14 is set in a reclined state, the guide roller 56 moves, together with the seatback 14, clockwise around the rotating shaft 36A of the recliner 36. On the other hand, because the positions of the anchor 58 and the rotating shaft 36A do not change, the wire 54 bends, and the tension that is applied to the wire 54 increases.

When the tension that is applied to the wire 54 becomes greater than the urging force of the compression coil spring 28, the supporting plate 20 is moved toward the seat rear side against the urging force of the compression coil spring 28. Due thereto, the compressed state of the headrest pad 18 is cancelled, and the headrest 16 becomes soft.

On the other hand, when returning again to the state of FIG. 3 from the state of FIG. 4, the angle of inclination of the seatback 14 becomes small, and, accompanying the rotation of the seatback 14, the guide roller 56 moves toward the seat front side around the rotating shaft 36A. Due thereto, the tension that is applied to the wire 54 decreases, and the urging force of the compression coil spring 28 becomes greater than this tension, and the supporting plate 20 moves toward the seat front side. As a result, the headrest pad 18 is compressed.

Here, in the same way as in the first exemplary embodiment, the present embodiment is structured such that, in a case in which the angle of inclination of the seatback 14 becomes greater than a predetermined angle, the compressed state of the headrest 16 is cancelled.

As the method therefor, for example, by providing a tension spring between the one end portion of the wire 54 and the supporting plate 20, the headrest 16 can be made to be soft only in cases in which the driver D is in a comfortable posture. Namely, in a case in which the seatback 14 is tilted only slightly toward the seat rear side, the tension spring stretches, but the supporting plate 20 itself is not pulled, and therefore, the headrest pad 18 can be maintained in a compressed state. Further, if the spring constant of the tension spring is adjusted and it is made such that the tension spring can stretch in cases in which the angle of inclination of the seatback 14 is greater than a predetermined angle, in cases in which the driver D is in a comfortable posture, the supporting plate 20 moves toward the seat rear side, and the compressed state of the headrest pad 18 can be cancelled.

(Operation)

Operation of the present embodiment is described next.

In the vehicle seat 50 of the present embodiment, due to the angle of inclination of the seatback 14 becoming large, the tension that is mechanically applied to the wire 54 can be made to be large, and therefore, there is no need for a part such as a motor or the like for taking-up the wire 54. Namely, a complex structure is not needed, and the hardness of the headrest 16 can be changed by a simple structure. Further, by eliminating electrical parts, lightening of the weight can be devised.

Moreover, in the present embodiment, the hardness of the headrest 16 can be changed even in a state in which electricity is not being supplied. Therefore, for example, even in a case in which the driver D sets the seatback 14 in a reclined state in a state in which the ignition is off, the headrest 16 can be made to be soft. Other operations are similar to those of the first exemplary embodiment.

Third Exemplary Embodiment

A vehicle seat 60 relating to a third exemplary embodiment is described next with reference to FIG. 5 and FIG. 6.

Note that structures that are similar to those of the first exemplary embodiment are denoted by the same reference numerals, and description thereof is omitted as appropriate.

Figure 5:
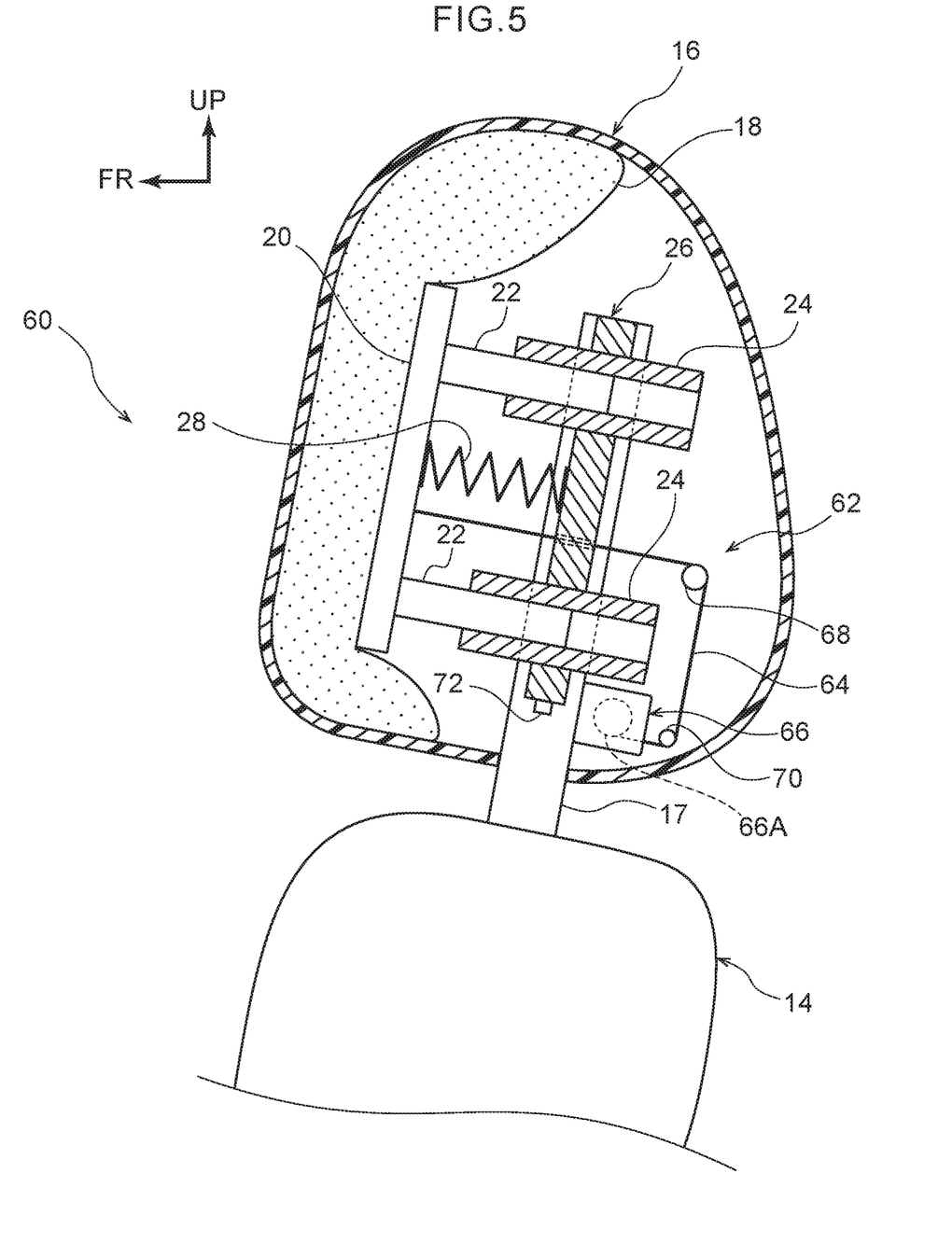
FIG. 5 is a side sectional view in which main portions of a vehicle seat relating to a third exemplary embodiment are enlarged, and is a drawing illustrating an upright state of the seatback.

As illustrated in FIG. 5, a moving mechanism 62 of the vehicle seat 60 of the present embodiment is structured to include a wire 64, a take-up device 66 and a sensor 72. All of these parts are provided at the interior of the headrest 16.

The wire 64 is routed at the interior of the headrest 16, and one end portion of the wire 64 is fixed to the rear surface of the supporting plate 20. Another end side of the wire 64 extends from the supporting plate 20 toward the seat rear side, and is trained around an upper side guide roller 68, and extends toward the seat lower side. Moreover, the wire 64 is trained around a lower side guide roller 70, and the another end portion of the wire 64 is connected to the take-up device 66.

The take-up device 66 has a spool 66A around which the lower end portion of the wire 64 is wound. The take-up device 66 has an unillustrated motor, and is structured such that the spool 66A rotates due to the motor being driven. Further, the take-up device 66 is electrically connected to a control section such as an unillustrated ECU (Electronic Control Unit) or the like. Due to the motor being driven on the basis of signals from the ECU, the wire 64 is taken-up, or the wire 64 is pulled-out.

The sensor 72 is mounted to the lower end portion of the base plate 26. A sensor, which can detect the angle of inclination of the headrest 16 such as a gyro sensor or an angle sensor or the like, is used as the sensor 72. Due to the angle of the headrest 16 being detected by the sensor 72, the angle of inclination of the seatback 14 with respect to the seat cushion 12 can be detected indirectly. Further, the sensor 72 is electrically connected to the ECU.

Figure 6:
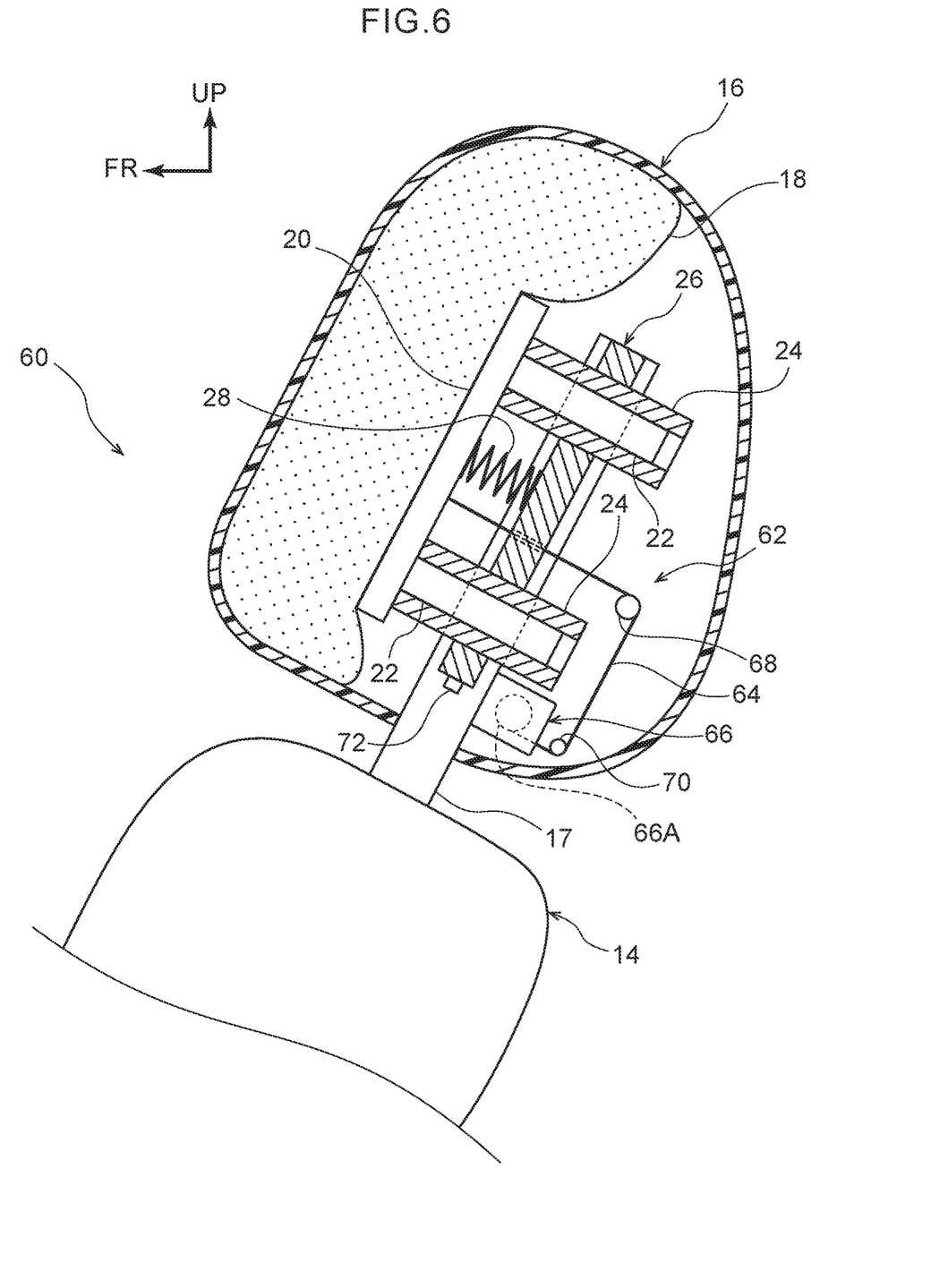
FIG. 6 is a side sectional view that corresponds to FIG. 5 and illustrates a state in which the seatback is tilted from the state of FIG. 5.

Here, as illustrated in FIG. 6, in a case in which the seatback 14 is tilted and is set in a reclined state, the ECU judges, from the angle of the headrest 16 that is detected by the sensor 72, that the angle of inclination of the seatback 14 has become greater than a predetermined angle, and operates the take-up device 66.

Due to the take-up device 66 being operated, the spool 66A is rotated in the direction of taking-up the wire 64, and the tension that is applied to the wire 64 increases. When the tension that is applied to the wire 64 becomes greater than the urging force of the compression coil spring 28, the supporting plate 20 is moved toward the seat rear side against the urging force of the compression coil spring 28. Due thereto, the compressed state of the headrest pad 18 is cancelled, and the headrest 16 becomes soft.

On the other hand, in a case of returning again to the state of FIG. 5 from the state of FIG. 6, the ECU judges, from the angle of the headrest 16 that is detected by the sensor 72, that the angle of inclination of the seatback 14 has become smaller than the predetermined angle, and the take-up device 66 is operated. Due to the take-up device 66 being operated, the spool 66A is rotated in the direction of pulling-out the wire 64. Due thereto, the tension that is applied to the wire 64 decreases, and the urging force of the compression coil spring 28 becomes larger than this tension, and the supporting plate 20 moves toward the seat front side. As a result, the headrest pad 18 is compressed.

(Operation)

Operation of the present embodiment is described next.

In the vehicle seat 60 of the present embodiment, because the moving mechanism 62 is provided at the interior of the headrest 16, the moving mechanism 62 can be added to the vehicle seat 60 that has already been manufactured, merely by replacing the headrest 16. Namely, the moving mechanism 62 can easily be added-on later, as compared with a structure that has the moving mechanism 62 such as the take-up device 66 and the like at the interior of the seatback 14. Other operations are similar to those of the first exemplary embodiment.

Although first through third exemplary embodiments have been described above, the present disclosure can, of course, be implemented in various forms within a scope that does not depart from the gist thereof. For example, the first exemplary embodiment and the third exemplary embodiment are structured such that the supporting plate 20 is moved and the headrest 16 is made to be a given softness in a case in which the angle of inclination of the seatback 14 becomes greater than a predetermined angle. However, the present disclosure is not limited to this. Namely, the headrest 16 can be made to be softer gradually by changing the amount of movement of the supporting plate 20 in accordance with the angle of inclination.

Further, in the above-described embodiments, the compression coil spring 28 is used as the urging member. However, the present disclosure is not limited to this, and another urging member may be used. For example, a plate spring or a cylinder or the like may be used as the urging member.

Moreover, the above embodiments describe structures that use the take-up device as the moving mechanism. However, the present disclosure is not limited to this. For example, an electric cylinder may be disposed at the interior of the headrest 16, and the rod of this electric cylinder may be fixed to the rear surface of the supporting plate 20. In this case, due to the electric cylinder being operated and the rod being pulled-out, the supporting plate 20 can be moved toward the seat front side, and the headrest pad 18 can be compressed. Conversely, if the supply of electricity to the electric cylinder is cancelled, the supporting plate 20 can be moved toward the seat rear side by the tension of the wire, and the compressed state of the headrest pad 18 can be cancelled.

What is claimed is:

1. A vehicle seat comprising:
   a seat cushion;
   a seatback that is rotatably connected to a seat rear side of the seat cushion;
   a headrest that is provided at a seat upper side end portion of the seatback, and that is configured to support a head portion of a vehicle occupant; and
   a hardness changing section that changes a hardness of a seat front side of the headrest by compressing a pad at an interior of the headrest, in a case in which an angle of inclination of the seatback with respect to the seat cushion is smaller than a predetermined angle, and canceling a compressed state of the pad, in a case in which the angle of inclination is larger than the predetermined angle.

2. The vehicle seat of claim 1, wherein the hardness changing section is structured to include:
   a supporting plate that is disposed at a seat rear side of the pad and that is configured to move in a seat longitudinal direction,
   an urging member that urges the supporting plate toward a seat front side, and
   a moving mechanism that operates and that moves the supporting plate toward a seat rear side in a case in which the angle of inclination is larger than the predetermined angle.

3. The vehicle seat of claim 2, wherein:
   the moving mechanism is structured to include a take-up device that is provided at an interior of the seatback, and a wire having one end portion that is mounted to the supporting plate and having another end portion that is wound at the take-up device, and
   the wire is taken-up by the take-up device in a case in which the angle of inclination is large, and the wire is pulled-out from the take-up device in a case in which the angle of inclination is small.

4. The vehicle seat of claim 2, wherein:
   the moving mechanism is structured to include a wire having one end portion that is mounted to the supporting plate and having another end portion that is mounted to an interior of the seat cushion, and a guiding member that is provided at an interior of the seatback and that guides the wire, and
   in a case in which the angle of inclination is large, due to the guiding member moving toward the seat rear side accompanying rotation of the seatback, tension that is applied to the wire is increased, and, in a case in which the angle of inclination is small, due to the guiding member moving toward the seat front side accompanying the rotation of the seatback, the tension that is applied to the wire is decreased.

5. The vehicle seat of claim 2, wherein:
   the moving mechanism is structured to include a take-up device that is provided at an interior of the headrest, and a wire having one end portion that is mounted to the supporting plate and having another end portion that is wound at the take-up device, and
   the wire is taken-up by the take-up device in a case in which the angle of inclination is large, and the wire is pulled-out from the take-up device in a case in which the angle of inclination is small.

* * * * *

UNITED STATES PATENT AND TRADEMARK OFFICE
CERTIFICATE OF CORRECTION

PATENT NO. : 10,836,290 B2  
APPLICATION NO. : 16/503867  
DATED : November 17, 2020  
INVENTOR(S) : Shotaro Inoue Page 1 of 1

It is certified that error appears in the above-identified patent and that said Letters Patent is hereby corrected as shown below:

On the Title Page

Item (71), applicant 1, city, delete "Toyota" and insert --Toyota-shi Aichi-ken--, therefor.

Item (72), inventor 1, city, delete "Nisshin" and insert --Nisshin-shi Aichi-ken--, therefor.

Item (73), assignee, city, delete "Toyota" and insert --Toyota-shi Aichi-ken--, therefor.

Signed and Sealed this  
Second Day of March, 2021

Drew Hirshfeld  
*Performing the Functions and Duties of the  
Under Secretary of Commerce for Intellectual Property and  
Director of the United States Patent and Trademark Office*